(12) United States Patent
Pfeifer et al.

(10) Patent No.: US 8,571,831 B2
(45) Date of Patent: Oct. 29, 2013

(54) DETERMINATION OF THE GAP SIZE OF A RADIAL GAP

(75) Inventors: Uwe Pfeifer, Berlin (DE); Michael Zidorn, Stahnsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 430 days.

(21) Appl. No.: 12/878,224

(22) Filed: Sep. 9, 2010

(65) Prior Publication Data

US 2010/0328141 A1 Dec. 30, 2010

Related U.S. Application Data

(62) Division of application No. 11/632,333, filed as application No. PCT/EP2005/053157 on Jul. 4, 2005, now Pat. No. 7,869,979.

(30) Foreign Application Priority Data

Jul. 12, 2004 (EP) .................................... 04016357

(51) Int. Cl.
*G01S 13/88* (2006.01)

(52) U.S. Cl.
USPC ......................................................... 702/183

(58) Field of Classification Search
USPC ......................................................... 702/183
See application file for complete search history.

(56) References Cited

U.S. PATENT DOCUMENTS

2005/0088171 A1* 4/2005 Gualtieri ................. 324/207.26

* cited by examiner

*Primary Examiner* — Tung S Lau

(57) ABSTRACT

A method for determining the size of a radial gap between rotating and torsion-proof parts, particularly the parts of a turbomachine is provided. According to the method, an original signal emitted by a transmitter device located on the surface of the rotating part is received in a modified manner by a receiver device disposed on the torsion-proof part and is redirected to an evaluation unit. The evaluation device determines and displays the size of the radial gap from the received signal by determining the parameters of the trajectory of the rotating transmitter device.

18 Claims, 5 Drawing Sheets

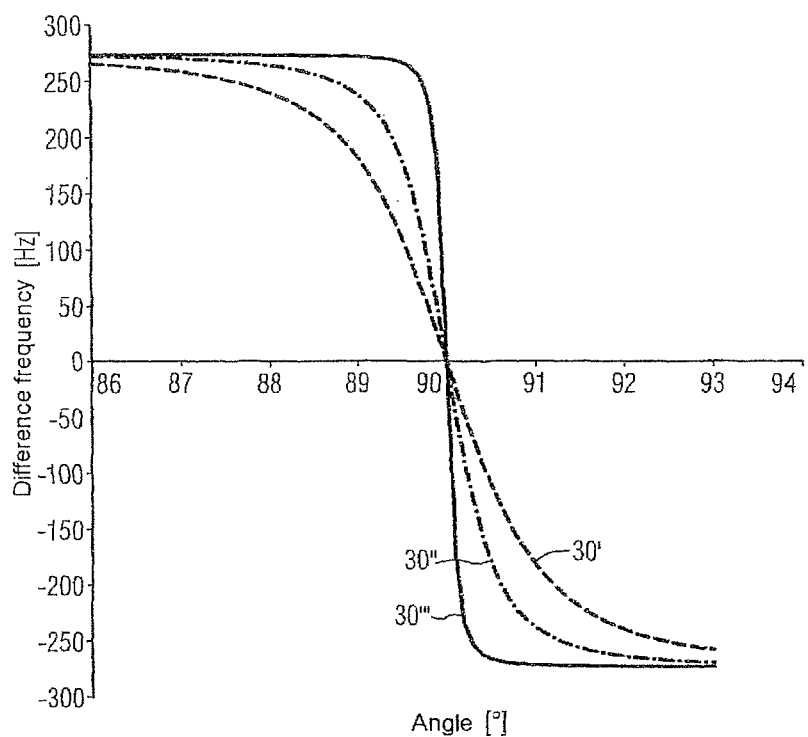
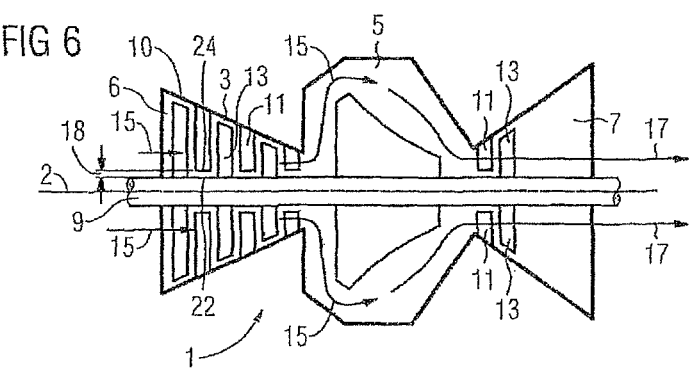

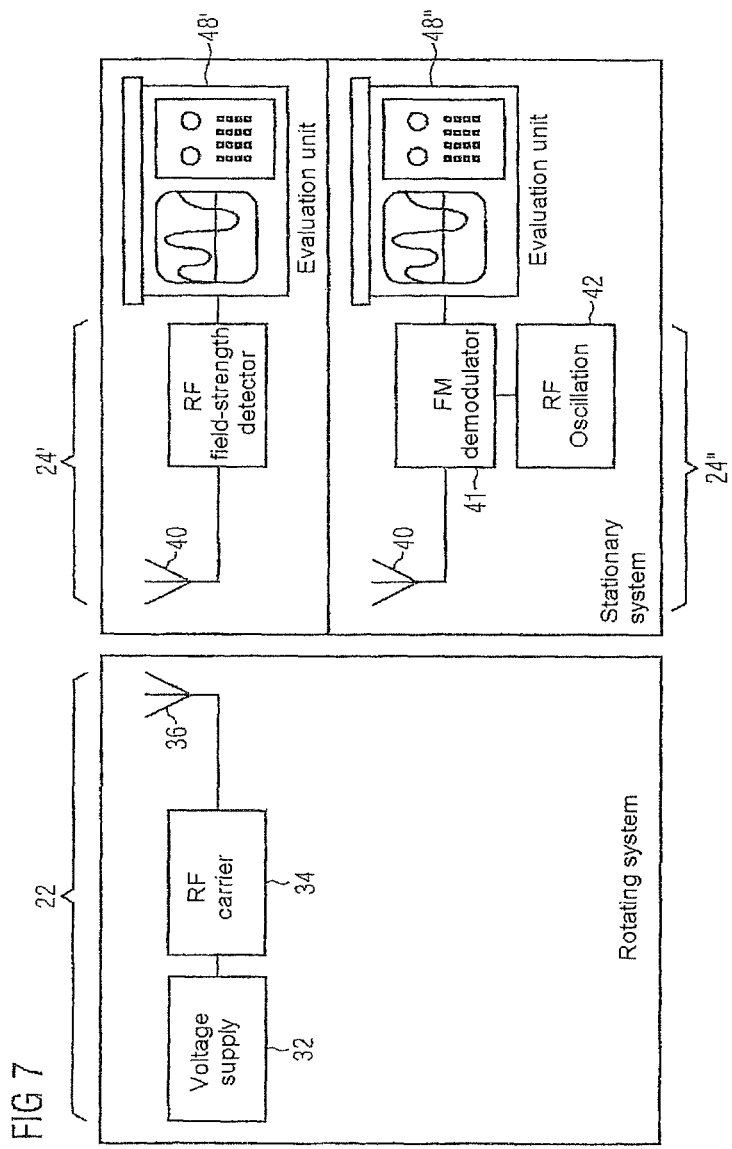

DETERMINATION OF THE GAP SIZE OF A RADIAL GAP

CROSS REFERENCE TO RELATED APPLICATIONS

This application is a divisional of U.S. Ser. No. 11/632,333 filed on Jan. 17, 2008 now U.S. Pat. No. 7,869,979. This application is the US National Stage of International Application No. PCT/EP2005/053157, filed Jul. 4, 2005 and claims the benefit thereof. The International Application claims the benefits of European Patent application No. 04016357.8 filed Jul. 12, 2004. All of the applications are incorporated by reference herein in their entirety.

FIELD OF INVENTION

The invention relates to a method and an apparatus for determination of the gap size of a radial gap between rotating and rotationally fixed components, in particular between those of a continuous-flow machine. The invention also relates to a continuous-flow machine having an apparatus such as this.

BACKGROUND OF THE INVENTION

Continuous-flow machines, such as compressors or turbines, have rotationally fixed stator blades arranged in rings and rotor blades, which are firmly connected to the rotor, which can rotate, of the continuous-flow machine, in each case alternately in the flow channel. The radial gaps are formed between the radially outer tips of the rotor blades and the boundary surface, which is located radially on the outside, of the flow channel. Radial gaps are likewise formed between the tips of the stator blades and the inner boundary surface of the flow channel, which is formed by the outer surface of the rotor. Various methods are known for measurement of these radial gaps during operation.

U.S. Pat. No. 4,326,804 describes a method for radial gap measurement between the guide ring and the rotor blades of a turbine. A means which reflects light and reflects a measurement light beam, preferably laser light, is provided at each rotor-blade tip. The respectively reflected light beam is directed at a light spot position detector via a lens system. Its focus appears, as a function of the radial gap, at a position in the detector from which the radial gap is determined. In this case, one measurement is carried out per revolution for each rotor blade.

Furthermore, DE 27 30 508 discloses an optical method for determination of the distance between a stationary and a rotating component. A light source emits a conical light beam which is projected as a light spot of different size onto a light-intensive receiver as a function of the gap size, and this light spot is evaluated for distance measurement.

Furthermore, patent specification DE 196 01 225 C1 discloses an apparatus for radial-gap monitoring for a turbine, in which a measurement reference point for reflection of light is provided on a turbine blade, with the light being directed at the measurement reference point from a glass-fiber probe which is passed through the turbine casing. During operation of the turbine, the currently detected intensity differences between the transmitted light and received light are compared with the intensity differences determined in a reference measurement, and the size of the radial gap is calculated from the discrepancy in the intensity difference between real measurement and the reference.

Furthermore, EP 492 381 A2 discloses a method for tip clearance measurement on turbine blades using an optical transmitter and receiver, with the receiver receiving the light that has been reflected from the turbine blades and, in this case, evaluating the time reflection-intensity profile.

This method is based on a transmitter and a receiver in the form of a sensor being placed in the stationary system, that is to say in the outer boundary wall or in the casing, in order to use optical effects to identify the rotating component, which is thus moving past the receiver or the sensor tip, and to determine the distance to it at this instant.

In general, these methods are characterized in that the receivers or sensors that are used cannot be miniaturized below a specific limit and thus have a mass which cannot be ignored. Furthermore, some of the methods require complex feed and transmission electronics.

These sensors cannot be mounted at the tip of a free-standing stator blade in a continuous-flow machine since a sensor such as this would have a negative influence on the natural oscillation behavior of the stator blades. These stator blades could be caused to oscillate during operation, thus reducing the life of the blades.

It is often impossible to arrange sensors in the rotating system, or this requires an unjustified high degree of complexity in order to supply the generally complex electronics. If sensors, or in particular receivers, are provided in the rotating system, a costly telemetry installation, which is susceptible to defects, may be required in order to pass information out of the rotating system, and this increases the general complexity.

SUMMARY OF INVENTION

One object of the invention is to specify a cost-effective and reliable method and an apparatus for determination of the gap size of a radial gap between rotating and rotationally fixed components, which has sensors with a comparatively small mass and small volume.

A further object is for the apparatus and the method to satisfy general requirements such as insensitivity to pressure and temperature, a wide operating range, that is to say dynamic range, with respect to the temperature of use and the rotation speed, and/or not to require any adjustment or calibration. A further object of the invention is to specify the use of an apparatus such as this for monitoring of the radial gap.

The object relating to the method is achieved by the features of the claims. Furthermore, the object relating to the apparatus is achieved by the features of the claims. Advantageous refinements are specified in each of the dependent claims.

One solution to the object relating to the method provides that, in order to determine the gap size of a radial gap between rotating and rotationally fixed components, in particular between those in a continuous-flow machine, in which a source signal which is emitted as a radio wave from a transmitting device that is arranged on the surface of the rotating component is received by a receiving device, which is arranged on the rotationally fixed component, and is passed on to an evaluation device, which evaluation device uses the received signal to determine the gap size of the radial gap, and to display this, by determination of the parameters of the path curve (trajectory determination) of the rotating transmitting device.

Another solution to the object relating to the method provides that, in order to determine the gap size of a radial gap between rotating and rotationally fixed components, in particular between those of a continuous-flow machine, a source signal which is emitted as a radio wave from a transmitting device which is arranged on the rotationally fixed component is reflected in a modified form by a reflection structure which is arranged on the rotating component, which is received, as a received signal, by a receiving device which is arranged on the rotationally fixed component and is passed on to an evaluation device, and which evaluation device uses the received signal to evaluate the change in comparison to the source signal in order to determine the parameters of the path curve (trajectory determination) of the rotating reflection structure, in order to determine and to display the gap size of the radial gap.

Both solutions are based on the inventive idea that the gap size of the radial gap can be determined by determination of the parameters of the path curve of a defined point which is arranged on the rotating component, that is to say by determination of its trajectory. The position of the receiving device is used as a stationary reference point for this purpose.

The distance, which changes all the time, between the rotating defined point (which may on the one hand be a transmitting device which is arranged on the rotating component or may on the other hand be the reflection structure) and the position of the receiving device as a stationary reference point is recorded, at least at times, as a function of the rotation angle of the rotating component. A function graph of the magnitude of the distance as a function of the rotation angle is derived by the evaluation device (trajectory determination), from which the desired parameter, specifically the minimum distance between the rotating transmitting device and the receiving device that is arranged in a rotationally fixed manner, is determined, and corresponds to the radial gap between the rotating component and the rotationally fixed component.

Radio waves have the advantage over optical waves that they can be produced, passed on, transmitted, received and processed further using comparatively simple electronic components. Furthermore, the use of radio waves results in a particularly wide operating range, that is to say dynamic range.

In one advantageous refinement, the signals are radio-frequency (RF) electromagnetic waves at a frequency in the range between 0.5 MHz and 100 GHz, in particular at a frequency in the range from 100 MHz to 10 GHz. The use of electromagnetic radio waves results in general independence from the medium that is located in the radial gap. Furthermore, comparatively small and low-mass transmitting/receiving components with high resolution, a wide dynamic range and which cost little are available for electromagnetic radio waves, and these allow a differentiating measurement of the radial gap at high rotation speeds, such as those which occur during operation of a continuous-flow machine.

According to a further advantageous refinement, in order to determine the distance between the rotating point and the reference point, the evaluation device evaluates the field strength and/or the intensity of the received signal. The revolving, that is to say rotating, transmitting device cyclically moves towards and away from the stationary receiving device on its circular path, so that a continuously varying field strength or intensity of the received signal is recorded by the receiving device, as a function of the distance between the two devices. In this case, the field strength and the intensity of the received signal are strongest at the point where the transmitting and receiving devices are opposite, forming the shortest possible distance between them. When electromagnetic waves are used as signals, the field strength is evaluated.

Instead of the transmitting device, a reflection structure can be provided on the rotating component, which reflects a source signal (which is transmitted as a radio wave from the transmitting device which is now mounted in a rotationally fixed manner) to the receiving device (which is mounted in a rotationally fixed manner) and in this case results in manipulation, that is to say variation, of the source signal, and this is identified by the evaluation device. Apart from this, the evaluation device is equipped analogously to the first solution.

The trajectory determination, that is to say the parameters of the path curve of a defined point on a rotating circular path, can alternatively be determined by evaluating the frequency shift in the received signal caused by the Doppler effect, instead of by measurement of the intensity and/or field strength. If the transmitting device is moving, the source signal that is transmitted from it as a radio wave is modulated by the Doppler effect.

According to one advantageous proposal, the evaluation device filters out the Doppler frequency, that is to say the difference frequency of the received signal, by frequency demodulation from the received signal. The gap size of the radial gap can be determined from this on the basis of the time duration of the change in the difference frequency.

The first solution to the object relating to the apparatus provides that, in order to carry out the method as claimed in the claims, for determination of the radial gap between rotating and rotationally fixed components, in particular between those in a continuous-flow machine, a transmitting device which transmits radio-frequency waves is arranged on the rotating component and a receiving device which receives radio-frequency waves is arranged on the rotationally fixed component, and is connected to an evaluation device for communication purposes.

In one advantageous refinement of the apparatus, the transmitting device can be supplied with energy by means of an inductive coupling from the rotationally fixed component. As an alternative to this, the transmitting device can be supplied with energy by a battery, which is likewise arranged on the rotating component. This allows the transmitting device to be supplied with energy without any contact and thus without wear. The design of the economic transmitting device results in the capacity of a battery being sufficient to supply the transmitting device with energy over a plurality of years until, for example, the servicing of the continuous-flow machine allows the rotor to be exposed, and thus allows the battery to be replaced.

A second solution to the object relating to the apparatus provides that, in order to carry out the method as claimed in for determination of the radial gap between rotating and rotationally fixed components, in particular between those in a continuous-flow machine, a reflection structure, which can receive and transmit radio-frequency waves is arranged on the rotating component, and a transmitting and receiving device which processes radio-frequency waves is arranged on the rotationally fixed component, which receiving device is connected to an evaluation device, for communication purposes.

The reflection structure is expediently formed by a dipole which is arranged on an insulated mount layer and has an RF diode, with the dipole preferably being in the form of a non-linear, passive dipole. The dipole receives the source signal transmitted from the transmitting device and uses the RF diode to transmit an electromagnetic wave at approximately twice the frequency back, with this electromagnetic wave furthermore being modulated by the Doppler effect, as a result of the rotation. The receiving device filters the electromagnetic wave at twice the transmission frequency out of the received signal, and passes this to the evaluation device. The electromagnetic waves which are reflected in any case from a metallic or planar surface of the rotating component, and which are at the same frequency as the source signal, are therefore ignored. The devices operate using radio waves whose frequencies are in the range between 0.5 MHz and 100 GHz, preferably 100 MHz and 10 GHz.

The transmitting and receiving devices can be arranged as co-axially as possible with respect to one another if the transmitting device and the receiving device respectively have a transmitting antenna and a receiving antenna which respectively have a point-beam or a linear-beam characteristic.

The solution to the object of the invention relating to use proposes that a continuous-flow machine is equipped with an apparatus as claimed in the claims, in which a method as claimed in the claims can be carried out. This allows radial gaps to be monitored in the continuous-flow machine, which is preferably in the form of a stationary gas turbine, in which these radial gaps can assume critical values in particular during hot starting of the continuous-flow machine. Furthermore, an axial shift, which is carried out in order to improve efficiency, of the rotor in a continuous-flow machine which has a conical flow channel can be carried out particularly exactly. This results in the flow medium in the continuous-flow machine being carried correctly past the rotor blades in the continuous-flow machine, allowing the flow losses caused by the radial gap above the blade tips in the flow medium to be minimized.

BRIEF DESCRIPTION OF THE DRAWINGS

The invention will be explained with reference to a drawing, in which:

FIG. 5 shows the difference frequency of an electromagnetic RF signal, which has been modulated by the Doppler effect, from a moving transmitting device, FIG. 6 shows a schematic illustration of a continuous-flow machine in the form of a gas turbine, FIG. 7 shows an apparatus according to the invention for determination of the gap size of the radial gap.

DETAILED DESCRIPTION OF INVENTION

Figure 1:
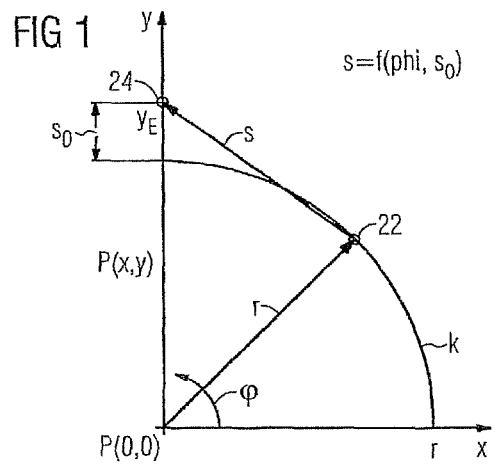
FIG. 1 shows schematically, a measurement arrangement for determination of the parameters of the relative path curve of a rotating point.

FIG. 6 shows a continuous-flow machine 1 according to the invention, in the form of a gas turbine with a compressor 3, a combustion chamber 5 and a turbine unit 7. Rotor blades 13 are arranged on the rotor 9 of the gas turbine in the compressor 3 and, together with stator blades 11 which are attached to the casing 10, compress the inlet air flow 15 in the flow channel 6. The compressed air flow 15 is burnt in the combustion chamber 5 with the addition of a fuel to form a hot gas 17, which is expanded on the stator blades 11 and on the rotor blades 13 in the turbine unit 7, producing work. During the process, the rotor 9 is driven, and drives not only the compressor 3 but also a process machine, for example an electrical generator.

FIG. 1 shows a detail of the measurement arrangement for the proposed trajectory method. A transmitting device 22 rotates on a circular path K about the coordinate origin P(0, 0) of the Cartesian coordinate system P(x, y), through which the rotation axis 2 of the rotor 9 of the gas turbine runs. By way of example, the transmitting device 22 may be arranged on the surface of the rotor 9, which forms the inner boundary surface for the flow channel 6 of the gas turbine.

A receiving device 24 which is arranged in a rotationally fixed manner is in this case located outside the circular path K, for example at the free end of a free-standing stator blade 11 in the gas turbine, which is opposite the inner boundary surface, forming a radial gap 18 (FIG. 6).

The distance s between the continuously varying position of the transmitting device 22 and of the receiving device 24 is determined at least at times. The minimum magnitude of the distance s is the distance $s_0$ to be monitored and to be determined, and which is to be determined for the gas turbine as the gap size of the radial gap 18 between the rotationally fixed and rotating components.

Figure 2:
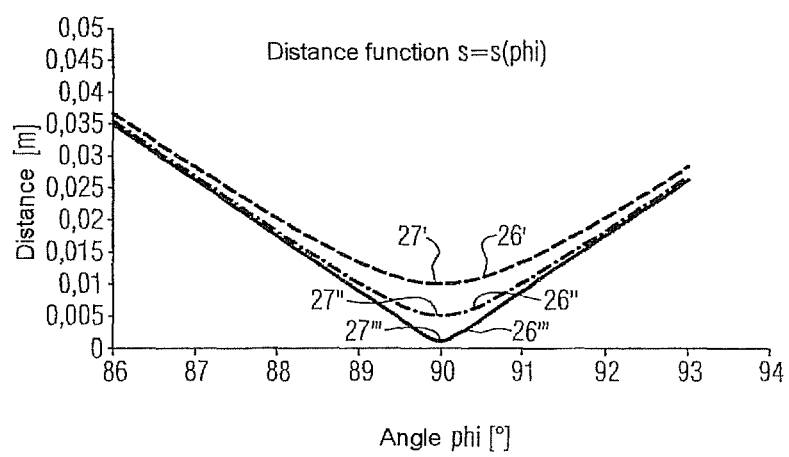
FIG. 2 shows a diagram of the distance function $s=f(\phi)$.

The rotation of the rotor 9 at a constant angular velocity results in the time-resolved and position-resolved distance s being functionally related to the rotation angle $\phi$ of the rotor 9 and the distance $s_0$, as follows:

$$s = f(\phi, s_0) \tag{1}$$

which is illustrated at least partially in the diagram in FIG. 2. The section of the rotation angle $\phi$ under consideration extends from 86° to 94°, on the assumption that the position of the receiving device 24, which is attached to the free-standing stator blade, is at the point P (0, $y_E$), that is to say the receiving device 24 is arranged on the ordinate.

FIG. 2 shows the relationship between the distance s and the rotation angle $\phi$ for three different distances $s_0$ for a measurement arrangement in which the rotor 9 has a radius of r=0.5 m, thus resulting in three different relative path curves. The three distance function graphs 26 which result from this are illustrated in FIG. 2. Each distance function graph 26 has a relative minimum 27 in the determined path curve of the transmitting device 24 at an angle of $\phi=90°$.

Since the aim is to measure the distance $s_0$ during operation, it is expedient not to measure the distance s, but to measure the velocity of the transmitting device 24 by means of the first derivative $ds/d(\phi)$ of the distance s.

Figure 3:
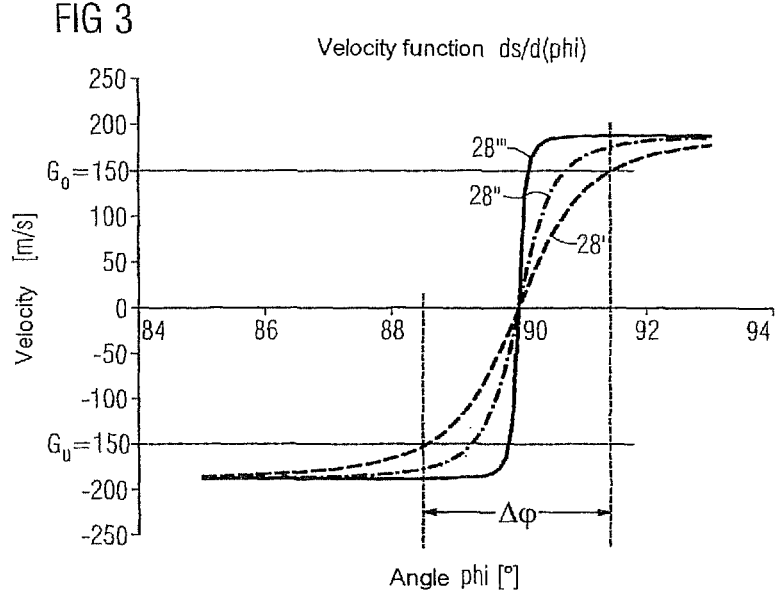
FIG. 3 shows a diagram of the velocity function $ds/d(\phi)$.

The first derivative of the distance function illustrated in FIG. 2 is illustrated as a velocity function in FIG. 3. The rises in the velocity function graphs 28 have different gradients, depending on the particular minimum distance $s_0$. The velocity function graphs 28 flatten out to a greater extent, the greater the minimum distance $s_0$ is between the transmitting device 22 and the receiving device 24 at an angle of $\phi=90°$.

The gap size can be determined by determination of a necessary rotation angle $\Delta y$ for which the velocity function graph 28 is located within an interval [$G_u$, $G_o$] which is defined by a lower velocity limit $G_u$ and an upper velocity limit $G_o$. The rotation angle $\Delta y$ determined in this way is proportional to the gap size of the radial gap 18, corresponding to the distance $s_0$. Because of the constant angular velocity of the rotor 9, as is necessarily required for flow generation when using stationary continuous-flow machines, the rotation angle $\Delta\phi$ can be converted to a time period by means of a linear conversion.

Various signal forms, that is to say carrier media, and various detection methods can be used for distance measurement. Sound waves, ultrasound waves or electromagnetic radio waves are used as carrier media. Intensity measurement in the case of sound waves on the one hand or field-strength measurement in the case of electromagnetic radio waves on the other hand can be used as detection methods. Furthermore, the Doppler effect can be used as a detection method for both carrier media.

The detection method will be described in the following text with reference to the Doppler effect.

Figure 4:
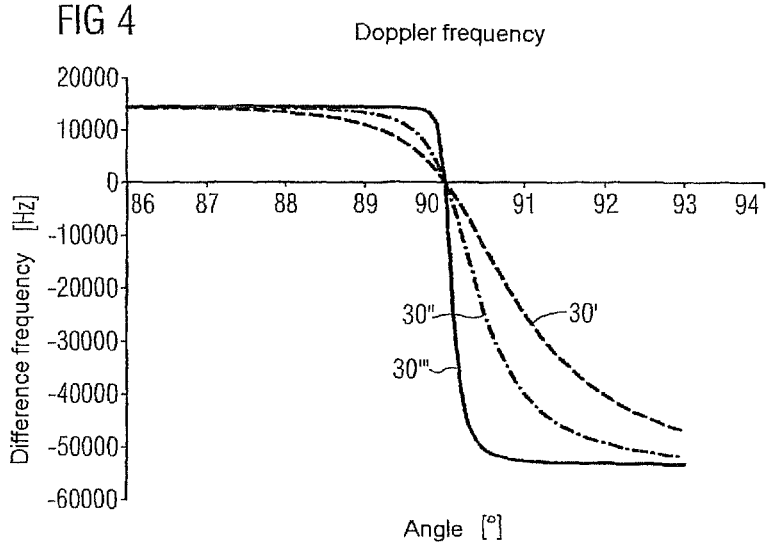
FIG. 4 shows the difference frequency of a sound-wave signal, which has been modulated by the Doppler effect, from a moving transmitting device.

FIG. 4 shows the difference frequencies, which have been filtered out of the received signal, when using ultrasound-based transmitting and receiving devices 22, 24. If the radial gap is determined, for example, using a transmission frequency of $f_0=40$ kHz, a radius of $r=0.5$ m and a rotation speed of $n=3600$ rpm, using ultrasound-based transmitting and receiving devices, then it can be seen that a useful received signal, which can be differentiated, can be expected only in the rotation angle range of $\Delta\phi\approx\pm 2°$. However, only about 4-6 oscillations occur in this interval when using a transmission frequency of $f_0=40$ kHz, so that sufficiently accurate differentiation of the Doppler frequency function graphs 30 for use in a continuous-flow machine at a rotation speed of $n=3600$ rpm is possible only to a limited extent. If radial gaps 18 have to be monitored at relatively low rotation speeds, then the cost-effective use of ultrasound-based transmitting and receiving devices 22, 24 may be adequate.

On the assumption of a constant wave propagation speed, analysis of the Doppler equation $$f = \frac{f_o}{\left(1 - \frac{v}{c}\right)} \qquad (2)$$

when approaching, and $$f = \frac{f_o}{\left(1 + \frac{v}{c}\right)} \qquad (3)$$

when moving away, shows that the frequency shift to be expected, that is to say the frequency interval in which the difference frequencies to be expected are located, is proportional to the transmission frequency. A transmission frequency that is as high as possible is thus advantageous in order to obtain a received signal which can be evaluated particularly well.

If a radio-frequency (RF) transmitting and receiving device is used instead of the ultrasound-based transmitting and receiving device, for example with a transmission frequency of $f_0=435$ MHz, this allows sufficiently accurate differentiation of the Doppler-frequency function graph 30 determined by the evaluation device. In consequence, Doppler frequencies which can be evaluated particularly well can in this case be filtered out of the received signal. For the chosen example, they have a frequency shift of [−280 Hz, 280 Hz].

In this context, FIG. 5 shows the Doppler-frequency function graphs 30 with identical parameters from FIG. 4. The associated gap size and thus the distance $s_0$ can be determined from the gradient of the respective Doppler-frequency function graphs 30', 30'', 30''', and from their gradients.

The transmission frequency of $f_0=435$ MHz chosen in the example is licensed for telemetry. Furthermore low-cost, functionally optimized and miniaturized transmitting/receiving components are commercially available as surface mounted devices (SMDs), and their masses are negligible in comparison to a free-standing stator blade. Higher frequencies are in this case desirable, and are also achievable.

The difference frequency can be obtained by frequency demodulation from the received signal. The determination of the desired gap size can be derived from the determination of the rotation angle $\Delta\phi$, which can be determined from the time period in which the difference frequency function graph 30 is located in the frequency interval of [−200 Hz, +200 Hz]. By way of example, a signal processor can be used for signal evaluation.

A range of approximately 20 cm is expediently adequate for the transmitting and receiving devices 22, 24, so that only extremely low transmission powers in the sub-mW range are required. This means that the transmitting device 22 can be expected to have a very low power consumption, thus allowing installation in the rotating system. The required feed energy can be injected into the rotating system without contact being made (inductively). Alternatively, a battery supply using commercially available lithium cells is also feasible and allows adequate operating times to be achieved. Furthermore, as a result of the limited range, the radial gap is determined only at times.

It should be noted that, instead of the difference frequency, the field strength of an electromagnetic signal or the intensity of a sound wave can also be used in a similar manner to determine the distance function $s=f(\phi, s_0)$.

The technical implementation for determination of the distance function will be described in the following text on the basis of the Doppler effect, since this occurs independently of the chosen signal form. The trajectory method is used for determination of the gap size for all of the technical implementations, based on the determination of the field-strength profile, of the intensity profile or of the frequency shift.

Figure 8:
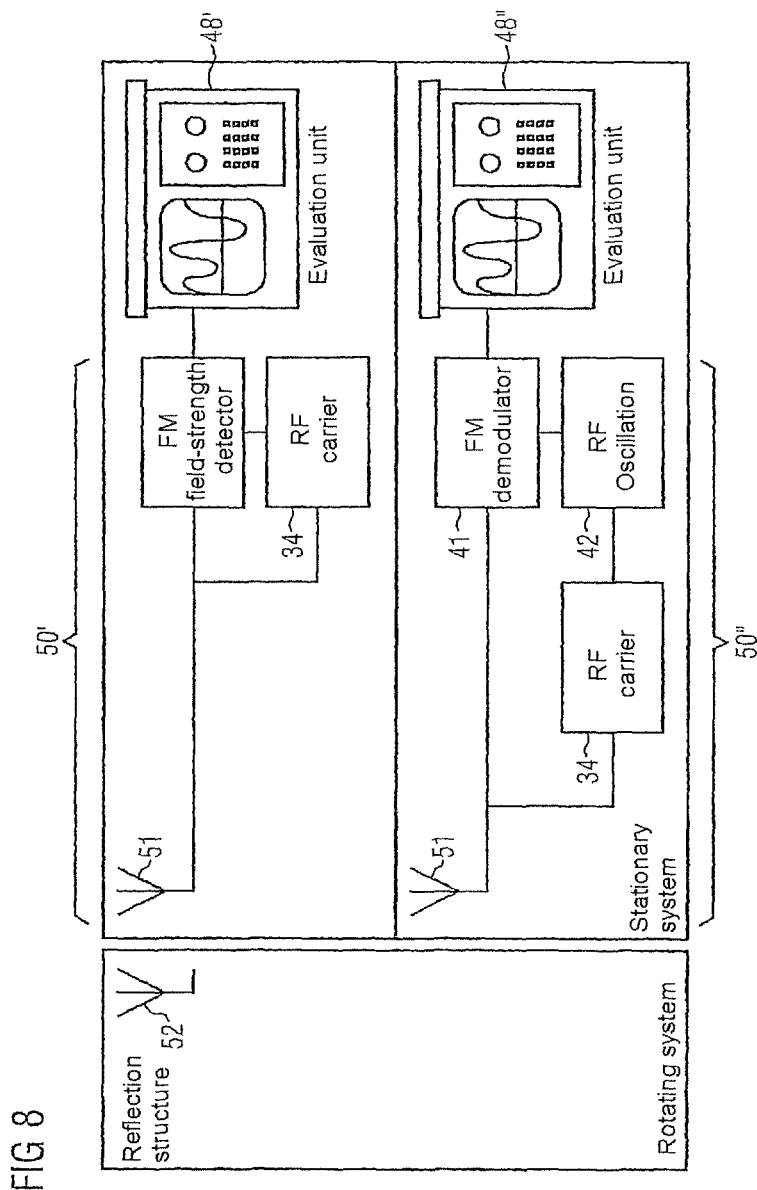
FIG. 8 shows an alternative design for an apparatus according to the invention for determination of the radial gap.

FIGS. 7 and 8 show, schematically, a plurality of configurations of a measurement chain for determination of the gap size of a radial gap between a rotating and a stationary system, that is to say between rotating and stationary components.

FIG. 7 shows a refinement of the invention in which the transmitting device 22 including its energy supply is arranged on the rotating system, that is to say the rotor. The transmitting device 22 has an energy source 32, a frequency generator 34 and a transmitting antenna 36.

The stationary system itself has a receiving antenna 40. Based on the Doppler effect, the receiving device 24'' has an FM demodulator 41 and an RF oscillator 42. If the field strength or the intensity of the received signal is evaluated rather than the Doppler effect, the receiving device 24' has a field-strength detector 43 in addition to the receiving antenna 40.

The receiving device 24 is coupled to an evaluation device 48, in which the trajectory is determined.

FIG. 8 shows an alternative refinement. A combined transmitting and receiving device 50 is arranged in a fixed position, and is connected to an evaluation device 48.

If the aim is to evaluate the difference frequency caused by the Doppler effect to determine the gap size, the combined transmitting and receiving device 50'' has an RF oscillator 42, a frequency generator 34 and an FM demodulator 41 in addition to the transmitting and receiving antenna 51. If the detection method used comprises a field-strength or intensity measurement, the combined transmitting and receiving device 50' has a frequency generator 34 and a field-strength detector 43.

In order to vary the source signal, which is transmitted by the transmitting and receiving device 50, at a frequency $f_s$ by means of the rotating system, a reflection structure 52, for example a non-linear, passive dipole with an RF diode, is arranged on it and is arranged on an insulating layer or carrier layer which does not reflect electromagnetic radio waves. The dipole receives the source signal, provided that it is in range of the transmitting and receiving antenna 51. The non-linear dipole uses the RE diode to double the frequency $f_s$ of the received source signal, and transmits a signal at twice the frequency $f_E$ back to the receiving device as the received signal. The movement of the dipole, on the circular path K modulates the signal that is thrown back, so that the transmitting and receiving antenna 51 can receive the received signal at twice the frequency and modulated by the Doppler effect. The receiving device 50 just extracts, that is to say filters out of the received frequency spectrum, the signal at twice the frequency $f_E$, and passes this to the evaluation device 48. The evaluation device 48 uses the varying field strength or the varying Doppler frequency of the received signal to determine the parameters of the path curve (trajectory determination), from which the gap size of the radial gap between the rotating and the stationary system or component can be determined.

The reflections of the source signal which occur as a result of smooth surfaces or in any other way and are essentially at the same frequency as the source signal are filtered out or ignored by the receiving device.

The apparatuses according to the invention have the advantage that they can be used in a temperature range from 0° C. to 450° C. Furthermore, the detection method is not dependent on the surface character, on the geometric character or on the physical characteristics of the rotating component. In addition, the apparatuses do not require adjustment, and require calibration only after initial installation, with this then being sufficient for the entire life of the apparatus.

The radial gap which exists between the tip of a free-standing stator blade and the rotor hub can thus be measured because of the comparatively low-mass and small sensors. They can, of course, also be used when a reflection structure or a transmitting device is provided at the tip of a rotor blade, free-standing or with a covering strip, and when at least the receiving antenna of the receiving device is provided on the outer boundary surface.

If, for example, each rotor blade in a rotor blade ring has a transmitting device, and/or a plurality of receiving antennas are distributed over the circumference, this allows the gap size to be determined in an even better manner, and at the same time at a plurality of locations.

We claim:

1. A method for determining a radial gap size between a rotating component and a stationary component of a continuous-flow machine, comprising:
    emitting a source signal as a radio wave from a transmitting device arranged on a surface of the rotating component;
    receiving a modified form of the source signal by a receiving device arranged on the stationary component;
    transferring the modified source signal to an evaluation device;
    determining parameters of a path curve of the rotating transmitting device by the evaluation device based on the modified source signal; and
    determining the gap size of the radial gap via the evaluation device based on the previously determined parameters of the path curve of the rotating transmitting device.

2. The method as claimed in claim 1, wherein the signals are radio-frequency electromagnetic waves at a frequency in a range between 0.5 MHz and 100 GHz.

3. The method as claimed in claim 2, wherein the signals are radio-frequency electromagnetic waves at a frequency in a range between 1 GHz and 10 GHz.

4. The method as claimed in claim 1, wherein the evaluation device evaluates a field strength or an intensity of the received signal to determine the parameters of the path curve.

5. The method as claimed in claim 1, wherein the evaluation device evaluates a frequency shift of the received signal due to a Doppler effect.

6. The method as claimed in claim 5, wherein the evaluation device filters out a Doppler frequency from the received signal by frequency demodulation.

7. The method as claimed in claim 6, wherein the radial gap size is determined from a time duration of the Doppler frequency.

8. An apparatus for determining a radial gap between a rotating component and a stationary component of a continuous-flow machine, comprising:
    a transmitting device for emitting a source signal as a radio frequency wave, wherein the transmitting device is arranged on the rotating component;
    a receiving device for receiving a modified form of the source signal, wherein the receiving device is arranged on the stationary component; and
    an evaluation device communicatively coupled to the receiving device, and
    wherein the evaluation device is configured for determining parameters of a path curve of the rotating transmitting device based on the modified source signal, and
    wherein the evaluation device is further configured for determining the gap size of the radial gap based on the previously determined parameters of the path curve of the rotating transmitting device.

9. The apparatus as claimed in claim 8, wherein the signals are radio-frequency electromagnetic waves at a frequency in a range between 0.5 MHz and 100 GHz.

10. The apparatus as claimed in claim 9, wherein the signals are radio-frequency electromagnetic waves at a frequency in a range between 1 GHz and 10 GHz.

11. The apparatus as claimed in claim 8, wherein the evaluation device evaluates a field strength or an intensity of the received signal to determine the parameters of the path curve.

12. The apparatus as claimed in claim 8, wherein the evaluation device evaluates a frequency shift of the received signal due to a Doppler effect.

13. The apparatus as claimed in claim 12, wherein the evaluation device filters out a Doppler frequency from the received signal by frequency demodulation.

14. The apparatus as claimed in claim 13, wherein the radial gap size is determined from a time duration of the Doppler frequency.

15. The apparatus as claimed in claim 8, wherein the transmitting device is supplied with energy through an inductive coupling with the stationary component.

16. The apparatus as claimed in claim 8, wherein the transmitting device is supplied with energy through a battery, wherein the battery is arranged on the rotating component.

17. The apparatus as claimed in claim 8, wherein the transmitting device and receiving device comprise a transmitting antenna and a receiving antenna respectively, wherein each of the transmitting and the receiving antennas has a point beam or a linear beam characteristic.

18. The apparatus as claimed in claim 8, wherein the rotating component is a rotor of the continuous flow machine, and the stationary component is a free-standing stator blade opposite the rotor.

* * * * *